June 16, 1925.  
O. J. PFEIFFER  
PIPE UNION  
Filed Sept. 29, 1921
1,542,406
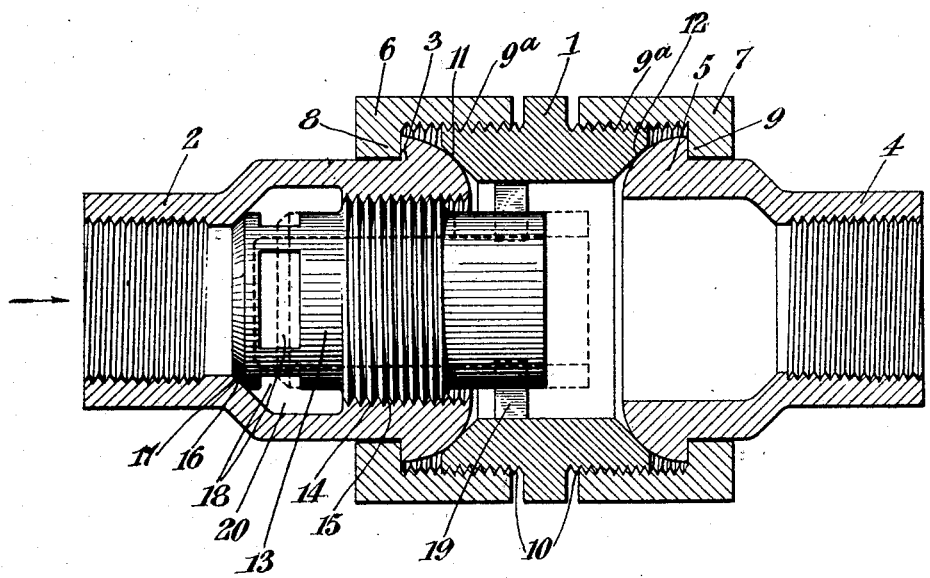

Patented June 16, 1925.

1,542,406

UNITED STATES PATENT OFFICE.

OTTO J. PFEIFFER, OF NEW YORK, N. Y., ASSIGNOR TO NASON MANUFACTURING COMPANY, A CORPORATION OF NEW YORK.

PIPE UNION.

Application filed September 29, 1921. Serial No. 504,198.

*To all whom it may concern:*

Be it known that I, OTTO J. PFEIFFER, a citizen of the United States, and a resident of the city of New York, county of Kings, and State of New York, have invented new and useful Improvements in Pipe Unions, of which the following is a specification.

My invention relates to improvements in pipe unions. It has for its object to combine in one structure a union and a valve, where the valve feature is independent of the coupling or uncoupling of pipe sections, so that the flow can be fully shut off, if desired, before uncoupling takes place, or the coupling may be entirely completed before the flow of fluid is turned on; to so arrange the valve that the shutting off of the flow may be accomplished in a direct and positive manner and without the necessity of moving any of the pipe sections; to arrange the valve and union so that seating connections to prevent leakage are located within the union itself, thus to prevent leakage more effectually; and generally to improve and simplify pipe unions.

My invention consists in the novel devices hereinafter shown and described.

I have found that by making my valve composed of a separate valve piece, not a part of the union itself, but operated therefrom, I secure a more direct and positive valve action and I am enabled to make my valve and union operate to shut off the flow by turning the union without requiring any of the pipe sections to be displaced.

I have found also that by the use of my improved arrangement that I can make all the necessary seating connections to prevent leakage within the interior of the union itself and I therefore do not require any external rings or gaskets. In the accompanying drawing and in the following paragraphs I describe the preferred form of my improved union, but I do not desire to limit myself to the form shown, but claim as my invention the ideas embodied therein as I more particularly point out in the accompanying claims. My drawing is partly in section, and partly as a side elevation.

My improved union has a body portion 1 and two members each adapted to connect with a pipe section. The left hand member which I term the valve tail piece 2 is internally screw threaded to receive a pipe section and is provided with an external projection or collar 3. The right hand member which I term the union tail piece 4 is likewise internally screw threaded and provided with a projection or collar 5. Locking nuts 6 and 7 having inwardly projecting rings 8 and 9 are adapted to engage behind the projections or collars 3 and 5 respectively of the valve tail piece and the union tail piece. The locking nuts are provided with internal screw threads 9ª adapted to engage corresponding screw threads 10 on the body portion. By screwing up either locking nut, the respective tail section with its pipe section may be tightly forced against the body portion. The connection made between the valve tail piece and the body portion at 11 forms a tight seating connection for the interior of the valve and prevents leakage of any of the flow. A similar seating connection to prevent leakage is formed between the union tail piece and the body portion at 12. As shown in the drawing I preferably curve the body portions of the tail pieces in forming these seating connections. This is done so that the connections will always be tight when the locking nuts are screwed up even if the tail pieces with the pipe sections are slightly out of line. By this arrangement of my union, connection can be made between the body portion and one of the tail pieces with its pipe section, independently of the connection between the other tail piece and its pipe section.

My valve, located within the pipe union and within the valve tail piece 2 is composed of a separate valve piece 13 which is exteriorly screw threaded as shown at 14, the screw threads being engaged with corresponding screw threads 15 interiorly located in the valve tail piece. Thus when the valve piece 13 is revolved with respect to the valve tail piece 2, the valve piece will move longitudinally in or out of the said valve tail piece. The end of the valve piece 16 is beveled and adapted to engage with similarly beveled valve seat 17 to form a valve connection. The valve piece back of the valve connection is hollow and is provided with ports 18 as shown in the drawing. Thus when the valve connection is open the fluid entering from the pipe section at the left may pass by the valve connection through the ports into the hollow part of the valve piece and on into the next pipe section. The flow is interrupted, however, by the valve connection when the valve piece is moved to the left and the part 16 is brought up tight against the valve seat 17. On the body portion 1 I provide integral lugs or tits 19 which are adapted to engage in recesses in the valve piece. Thus when the body portion 1 is turned the valve piece 13 must likewise turn. The use of a valve piece in my pipe union, separate from, but operated by the body portion has several distinct advantages, one of which is that a more direct and positive valve closure is acquired, and another that the parts are more easily assembled, and the valve can be operated without moving any of the pipe sections.

The operation of my valve is as follows: The drawing shows my valve closed with the flow entering from the left shut off. To open the flow, the body portion 1 with the locking nuts 7 and 6 are revolved in the appropriate direction. By means of the lugs or tits 19 the valve piece 13 is revolved and withdrawn to the right, opening the valve connection 16, 17, allowing the flow to pass into the widened interior of the valve piece 20, and through the ports 18 to the hollow interior of the valve piece and thus on through into the other pipe section. It should be noted that the valve may be operated in this manner by turning the body portion and locking nuts entirely independently of the coupling or uncoupling of the pipe sections or of the tail pieces, and also the valve is operated without any dislocation of position of the tail pieces 2 and 4 or to their pipe sections. The body portion 1 together with the locking nuts 6 and 7 turn freely, operating only the valve piece. If it is desired to shut off the flow for any reasons such as the uncoupling of a pipe section, the operation described above is reversed, the body portion revolved in the opposite direction and the valve piece moved to the left, closing the valve connection 16 and 17. My improvement is useful in that both the valve arrangement and coupling connections are united in one and the same structure so that it is unnecessary when uncoupling the pipe sections at any point, to go back any great distance to reach the nearest valve in order to shut off the flow. The valve action is independent of the coupling or uncoupling and does not require any of the pipe sections to be moved. My structure is compact, is easily assembled and installed, can be so installed by unskilled labor, presents a neat appearance, is less expensive than a separate union and valve, and is not liable to leakage.

What I claim as new and desire to secure by Letters Patent is:

1. A pipe union adapted to make connection between two pipe sections, said union comprising a body portion, a valve consisting of a valve piece separate from said body portion but operated therefrom and a valve seat, a valve tail piece, a union tail piece, each tail piece adapted to connect with a pipe section, and means to hold said tail pieces on the body portion, said valve being adapted to be opened or closed independently of the coupling or uncoupling of either of the pipe sections and said union tail piece being interiorly screw threaded to engage screw threads on outer portion of valve piece.

2. A pipe union adapted to make connection between two pipe sections, said union comprising a body portion, a valve tail piece, a union tail piece, each tail piece adapted to connect with a pipe section, said tail pieces having external projections, locking nuts adapted to engage the body portion having inwardly projecting rings to engage respectively said external projections on said tail pieces, and a valve consisting of a valve piece separate from said body portion but operated therefrom and a valve seat, said valve being adapted to be opened or closed independently of the coupling or uncoupling of either of the pipe sections and said valve tail piece being interiorly screw threaded to engage screw threads on outer portion of the valve piece.

3. A valve union for pipe sections, comprising a body portion and two members, each adapted to connect with a section of pipe, independent connections between each member and the body to permit such member to move relatively to the body independently of the other member, a valve operable independently of the coupling or uncoupling of pipe sections, and seat connections to prevent leakage located interiorly between said members and the body portion.

4. A pipe union adapted to make connection between two pipe sections, said union comprising a body portion, a valve consisting of a valve piece separate from said body portion but operated therefrom, and a valve seat, and seat connections to prevent leakage located interiorly in said union, said valve being adapted to be opened or closed independently of the coupling or uncoupling of one of the pipe sections.

5. A pipe union adapted to make connection between two pipe sections, said union comprising a body portion, a valve tail piece, a union tail piece, each tail piece adapted to connect with a pipe section, means to hold said tail pieces on the body portion, a valve consisting of a valve piece separate from said body portion but operated therefrom and a valve seat, the valve being adapted to be opened or closed independently of the coupling or uncoupling of either of the pipe sections, and a seat connection to prevent leakage located interiorly between said valve tail piece and said body portion.

6. A pipe union adapted to make connection between two pipe sections, said union comprising a body portion, a valve consisting of a valve piece separate from said body portion but operated therefrom, and a valve seat, and seat connections to prevent leakage located interiorly in said union, said valve being adapted to be opened or closed independently of the coupling or uncoupling of one of the pipe sections, said connections being adapted to permit the pipe sections to be slightly out of alinement.

7. A pipe union adapted to make connection between two pipe sections, said union comprising a body portion, a valve tail piece, a union tail piece, each tail piece adapted to connect with a pipe section, means to hold said tail pieces on body portion, a valve consisting of a valve piece separate from said body portion but operated therefrom and a valve seat, said valve being adapted to be opened or closed independently of the coupling or uncoupling of either of the pipe sections, and a seat connection to prevent leakage located interiorly between said valve tail piece and said body portion, said connection being rounded to permit the pipe sections to be slightly out of alinement.

In testimony whereof, I have signed my name to this specification.

OTTO J. PFEIFFER.